United States Patent [19]
Fisher et al.

[11] Patent Number: 6,133,658
[45] Date of Patent: *Oct. 17, 2000

[54] METHOD OF VOLTAGE SELECTION AND BEARING PROTECTION FOR AN ELECTRIC MOTOR

[75] Inventors: Lynn Edwin Fisher; Jerry Lynn Morris, both of Fort Wayne, Ind.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/014,227

[22] Filed: Jan. 27, 1998

[51] Int. Cl.⁷ .................................................. H02K 5/00
[52] U.S. Cl. ......................... 310/89; 310/68 R; 310/87; 310/91
[58] Field of Search ............................ 310/89, 71, 68 R, 310/87, 68 A, 91; 318/220, 225

[56] References Cited

U.S. PATENT DOCUMENTS

| | | | |
|---|---|---|---|
| 2,983,964 | 5/1961 | Vocht | 18/59 |
| 3,482,128 | 12/1969 | Keck et al. | 310/68 R |
| 3,564,306 | 2/1971 | Ott | 310/10 |
| 3,585,471 | 6/1971 | Ecclesia | 318/255 |
| 3,594,763 | 7/1971 | Peek | 340/240 |
| 3,629,535 | 12/1971 | Walters | 200/168 G |
| 3,710,059 | 1/1973 | Kuhn | 200/166 C |
| 3,829,106 | 8/1974 | Wheelock | 277/205 |
| 3,959,617 | 5/1976 | Hults | 200/305 |
| 4,135,171 | 1/1979 | Violet | 366/60 |
| 4,260,918 | 4/1981 | Engle | 310/87 |
| 4,320,929 | 3/1982 | Clark et al. | 308/230 |
| 4,593,163 | 6/1986 | Fisher | 200/80 R |
| 4,963,777 | 10/1990 | Blum | 310/68 A |
| 5,006,744 | 4/1991 | Archer et al. | 310/89 |
| 5,073,736 | 12/1991 | Gschwender et al. | 310/88 |
| 5,245,237 | 9/1993 | Fisher et al. | 310/89 |
| 5,315,194 | 5/1994 | Brusasco et al. | 310/68 R |
| 5,453,589 | 9/1995 | Mayer | 200/302.2 |
| 5,490,319 | 2/1996 | Nakamura et al. | 29/596 |

*Primary Examiner*—Thomas M. Dougherty
*Assistant Examiner*—Tran N Nguyen
*Attorney, Agent, or Firm*—Carl B. Horton, Esq.; Wayne O. Traynham, Esq.; Welsh & Katz, Ltd.

[57] ABSTRACT

An electric motor has a housing including a frame and first and second end shields disposed adjacent opposing ends of said frame to define a motor compartment. A stator winding is mounted on the housing within the motor compartment and includes at least first and second main windings. An armature is rotatably mounted on the housing within the motor compartment in spaced relation to the stator winding. A voltage selection switch, which is moveable between first and second positions, is mounted on the first end shield to allow the motor to be run at high or low voltage settings. The first end shield also includes a silicon-grease filled tubular seat which reduces the transfer of contaminants into the motor compartment.

6 Claims, 6 Drawing Sheets

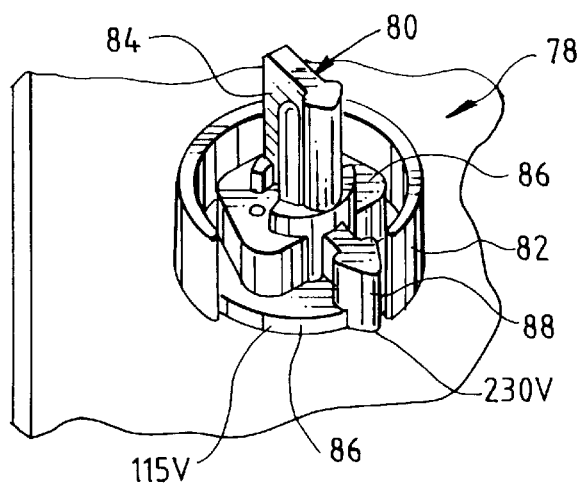
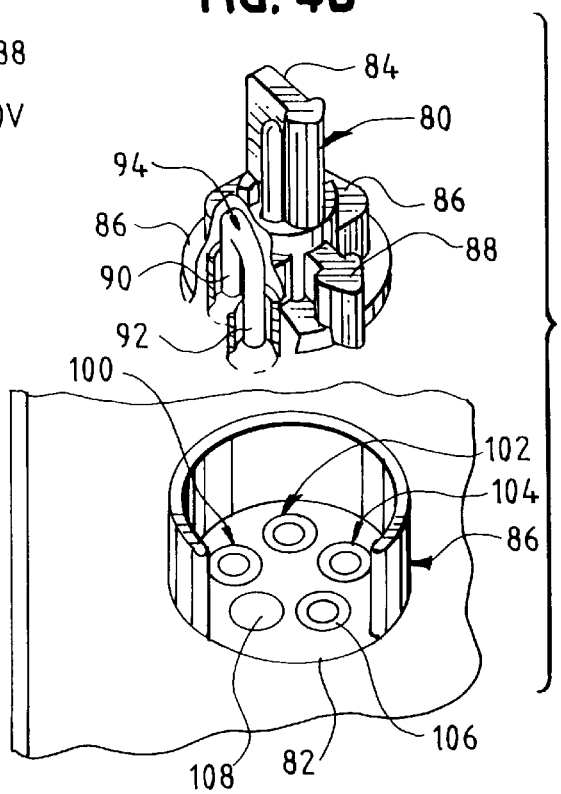
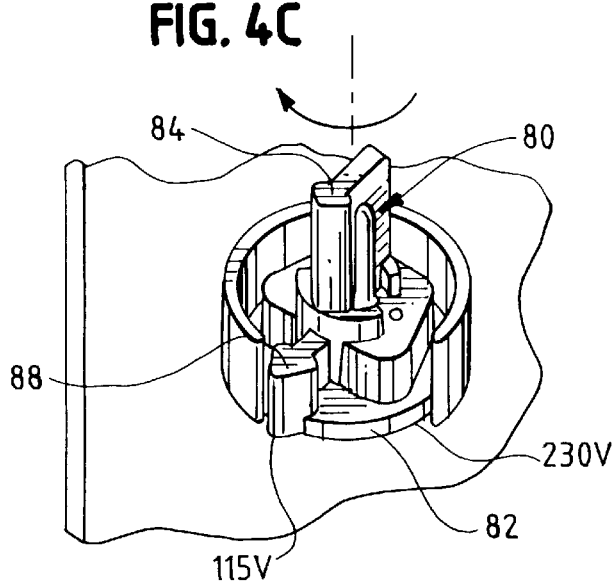

METHOD OF VOLTAGE SELECTION AND BEARING PROTECTION FOR AN ELECTRIC MOTOR

FIELD OF THE INVENTION

The present invention generally relates to electric motor driven pumps and, more particularly, to an electric motor for driving a pump which has an improved voltage selection feature as well as sealed front-end bearings.

BACKGROUND OF THE INVENTION

Electric motors such as, for example, single phase induction motors are manufactured in a variety of configurations and are used in a number of different applications. For example, swimming pools and whirlpool spas typically use a number of electric motors for various purposes such as, for example, driving a water pump for water circulation purposes. Moisture, dust, and other contaminates, which typically are prevalent in the environments associated with these types of applications, interfere with the operation of the motor and, over time, may lead to failure of the motor. To provide protection against the adverse effects posed by these contaminants, various techniques and motor designs have been utilized.

One approach to combat the contaminant problem is to utilize a two-compartment motor. In a two-compartment motor, the stator, armature, and other primary motor components are contained in a first compartment and the secondary electrical components are contained in a second compartment. For example, U.S. Pat. No. 4,593,163 discloses a two compartment motor in which a starting capacitor, a thermal protector, a terminal board, a starting switch assembly, and a manually actuable switch are mounted to an end shield of an induction motor. A thermoplastic molded cover is secured to the motor with axially directed screws to define the second compartment of the motor.

U.S. Pat. No. 5,245,237 discloses another two-compartment motor in which a control assembly is mounted within a second compartment of a two-compartment motor. The control assembly includes a control plate, a plurality of electrical components, and mounting means for securing the electrical components in position on the control plate. In order to switch the voltage setting of the motor between high and low settings, a voltage selection switch is mounted on the control plate within the secondary compartment.

Constructing a two-compartment electric motor that is to be used, for example, in swimming pool and whirlpool spa applications as discussed above has a number of disadvantages. For example, the costs of manufacturing a two-compartment motor is higher than the cost of manufacturing a one-compartment motor due, for example, to the costs associated with the second compartment. Second, a two-compartment motor design does not include sufficient measures to protect the front-end bearings from the adverse effects of water-based corrosion which is a main cause of motor failure in the above-referenced applications. Third, mounting the voltage selection switch on a separate control plate in a second compartment as disclosed in U.S. Pat. No. 5,245,237 instead of directly on the motor frame unnecessarily increases the costs of manufacturing the motor.

SUMMARY OF THE INVENTION

It is desirable to provide an electric motor having a voltage selection switch that is directly mounted to the end shield of the motor. It is also desirable to provide an electric motor having a front-end bearing unit which is sealed, for example, by means of a silicone grease material. These configurations provide a number of distinct advantages. First, the manufacturer's profit margin is increased for each motor that is sold because, for example, material costs are decreased due to the elimination of the secondary compartment. Second, the useful life of the motor is extended because the sealed bearing unit reduces the effects of corrosion on the motor. Third, the manufacturer's profits are increased due to the extended useful life of the motor.

Other features and advantages of the present invention are apparent from the description that follows.

DESCRIPTION OF THE DRAWINGS

FIGS. 4A–4C are perspective views of a portion of the motor shown in FIG. 1 which illustrate the operation of a voltage selection feature.

DETAILED DESCRIPTION OF THE INVENTION

Figure 1:
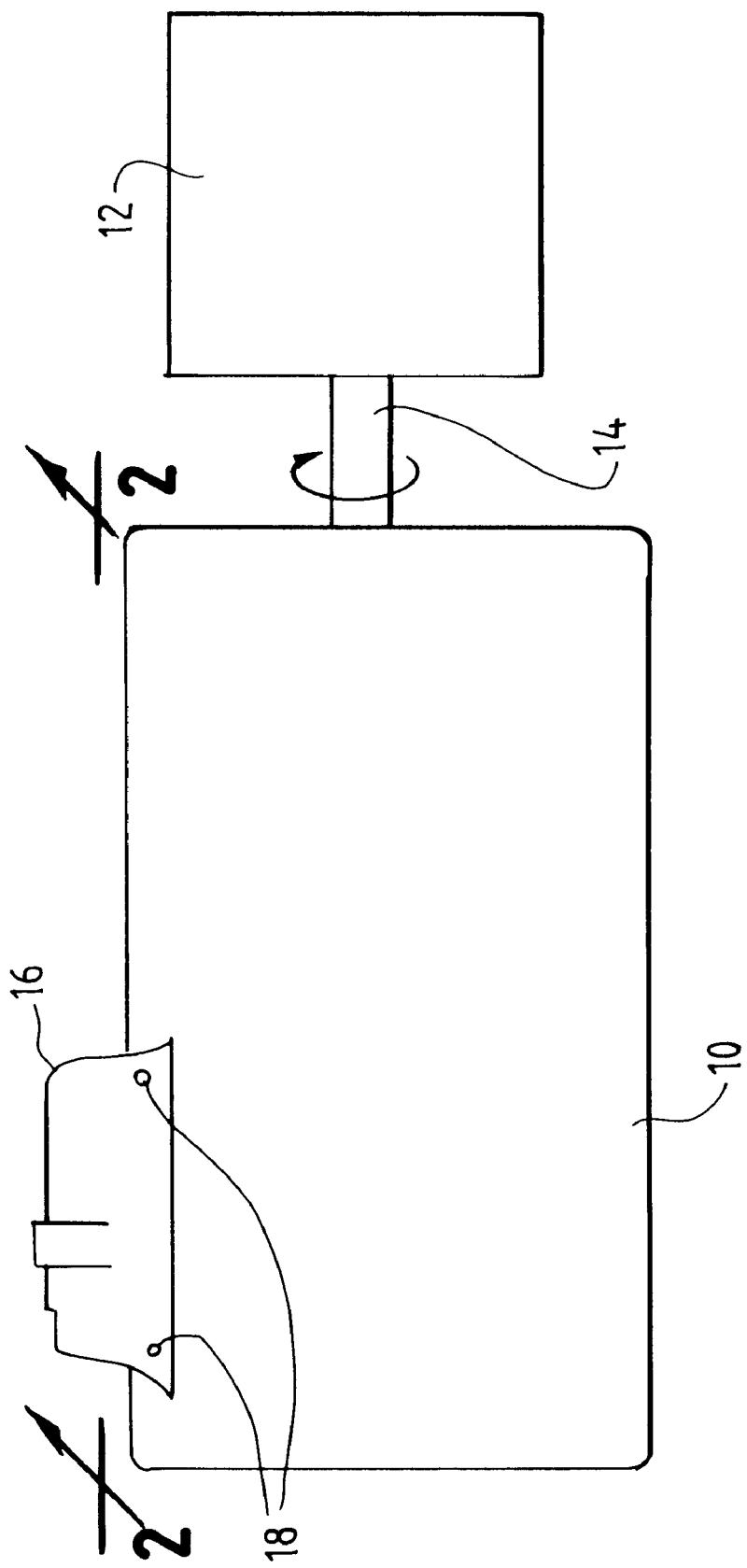
FIG. 1 is a front elevational view of an electric motor that is used to drive a load member according to an embodiment of the present invention.

Referring to FIG. 1, a front view of an electric motor 10 that is used to drive a load member 12 via shaft 14 according to an embodiment of the present invention is illustrated. Load member 12 may comprise, for example, a pump that typically is used, for example, in swimming pool and whirlpool spa applications for water circulation purposes. An external cover 16 is mounted to the electric motor 10 via screws 18 to define an external compartment. A capacitor 20 is housed within the external compartment and is operatively electrically connected to the main and start windings of the electric motor 10 as discussed in greater detail hereafter. The provision of the capacitor inside the cover 16 allows the capacitor 20 to be easily replaced. Motor shaft 14 extends outwardly from the electric motor 10 and may include a threaded or keyed end that is operatively coupled to load member 12.

Figure 2:
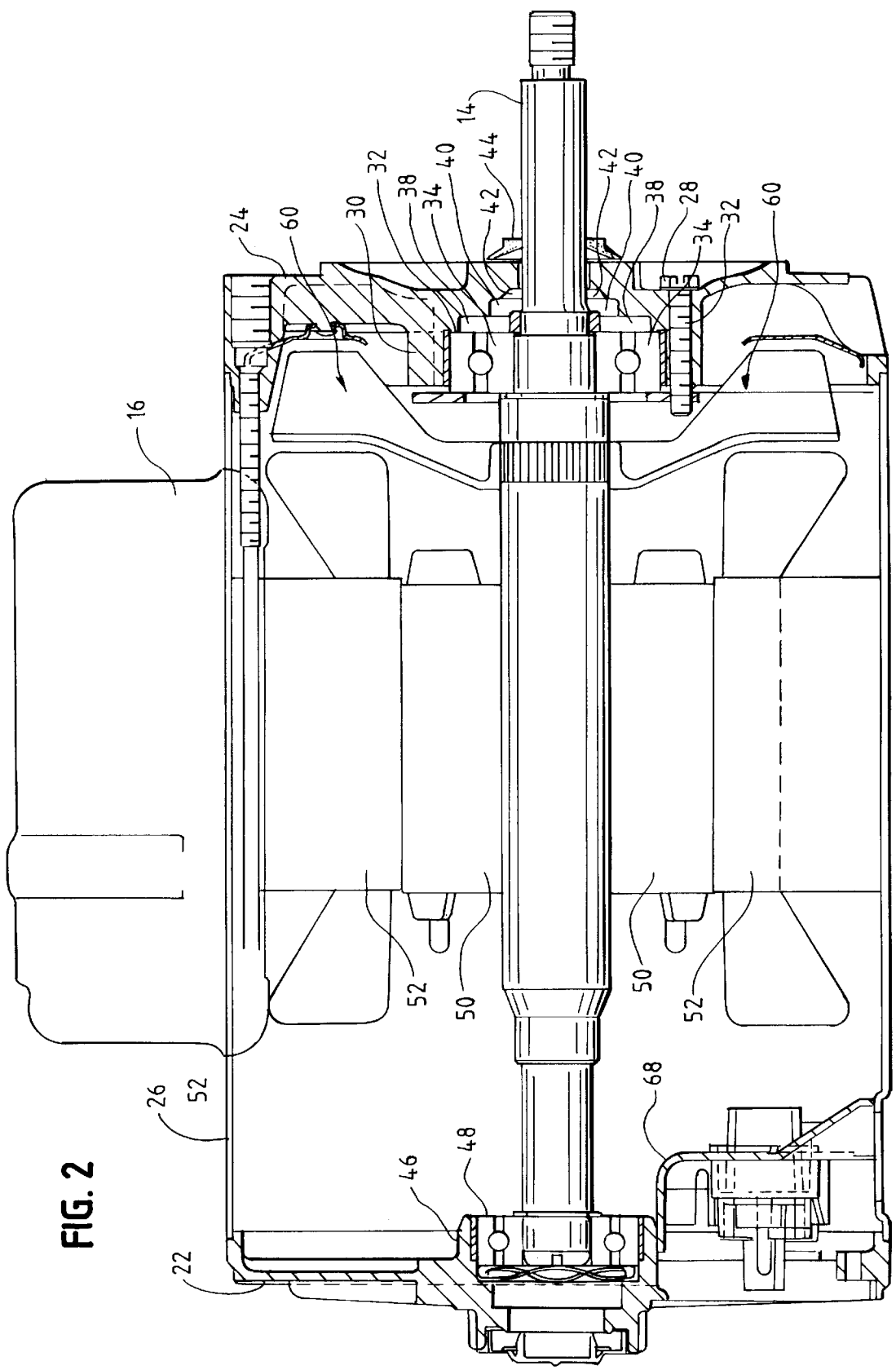
FIG. 2 is sectional view taken along lines 2—2 in FIG. 1.

FIG. 2 is a section view of the electric motor 10 taken along lines 2—2 in FIG. 1. Electric motor 10 includes a pair of end shields 22 and 24 which are connected to a motor frame 26 via suitable connectors such as, for example, screws 28, one of which is shown in FIG. 2. End shield 24 includes a tubular member 30 having an internal stepped surface. The internal stepped surface includes a shoulder portion 32 for supporting a bearing unit 34 and three disk-like cavities 38, 40, and 42. A lip seal 44 is mounted on the motor shaft 14 to reduce the passage of contaminants from the external environment through aperture 36 and into the motor compartment. A viscous, water impervious sealing material such as, for example, grease, may be inserted in the tubular member 30 to further reduce the contaminant transfer and prolong the useful life of bearing unit 34. This is accomplished because the presence of the sealing material in the cavities 38–42 minimizes the amount of water vapor and the like that contacts the bearing unit 34 over time and, therefore, correspondingly minimizes corrosion of the bearing unit 34.

The sealed bearing unit 34 may be manufactured as discussed hereafter. In particular, a quantity of the sealing material is placed in the tubular member 30 in an amount which is sufficient to fill the shoulder portion 32 and the disk-like cavities 38–42 prior to complete assembly of the motor. Insertion of the motor shaft 14 and the bearing unit 34 onto the shoulder portion 32 causes the sealing material to substantially fill the annular cavities 38–42 and the aperture 36. Because the cavities 38–42 and the aperture 36 are grease-filled, any contaminants that make their way past lip seal 44 are retarded and trapped by the sealing material.

Figure 5A:
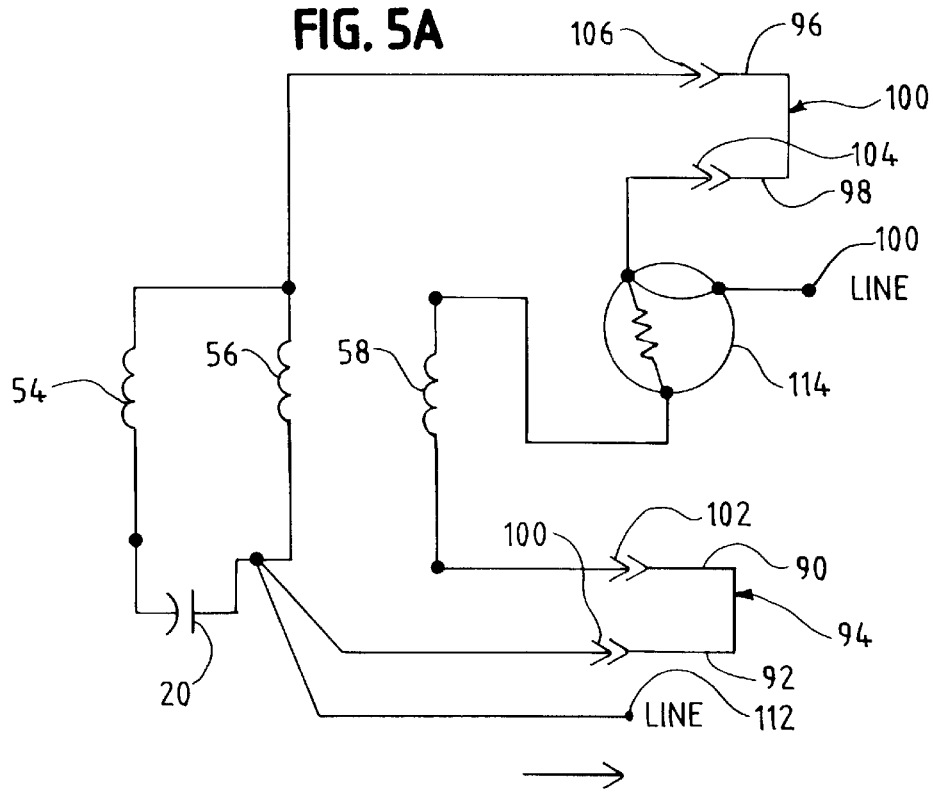
FIGS. 5A and 5B are schematic drawings which illustrate low and high voltage settings of the motor shown in FIG. 1.
Figure 5B:
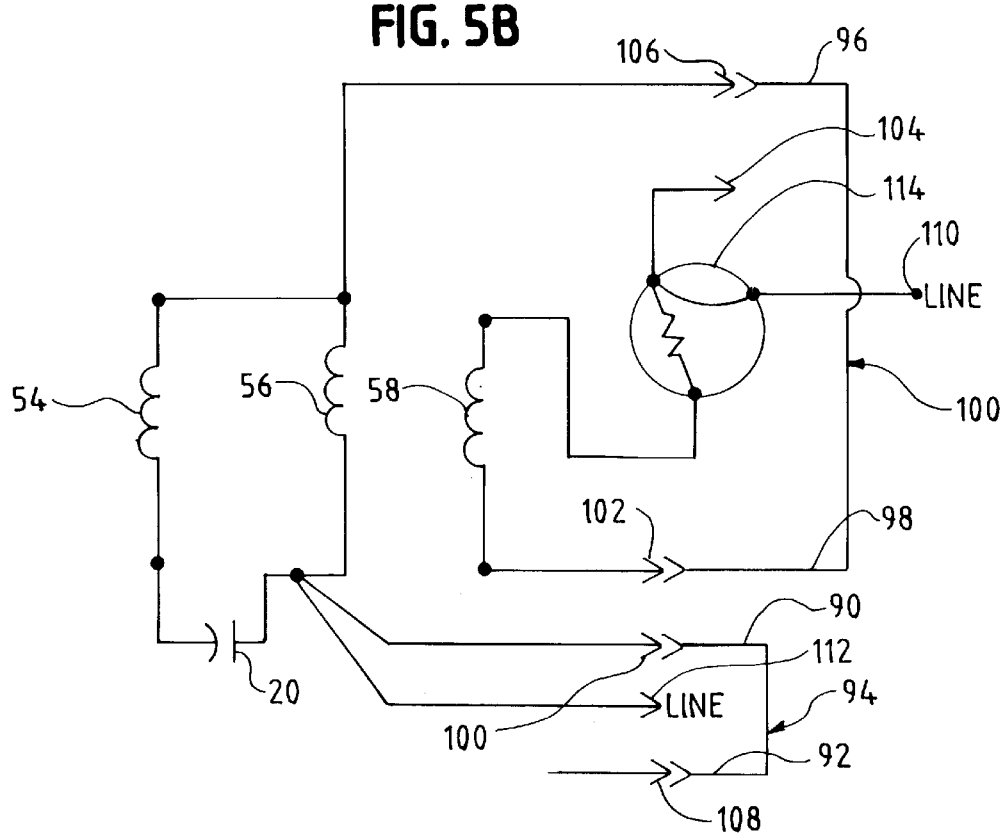

Referring back to FIG. 2, end shield 22 includes a tubular seat 46 for receiving a second bearing unit 48. Shaft 14 is journalled in bearing units 34 and 48 for rotation about its longitudinal axis. The electric motor 10 includes an inner rotor core 50 mounted on the shaft 14 in spaced relation to stator windings 52. As shown in FIGS. 5A and 5B, stator windings 52 comprise a start winding 54 and two main windings 56 and 58. In some applications, a centrifugal mechanism (not shown) may be connected to the shaft 14 to allow the start winding 54 to be deenergized after the motor comes up to speed. Fan blades 60 are connected to motor shaft 14 to draw air through a plurality of openings in the sides of end shield 24 (not shown), into the space enclosed by the frame 26 and end shields 22 and 24, and out through the openings 62 (FIG. 3A) in end shield 22. The openings are designed to generally reduce the transfer of contaminants into the motor compartment.

Figure 3A:
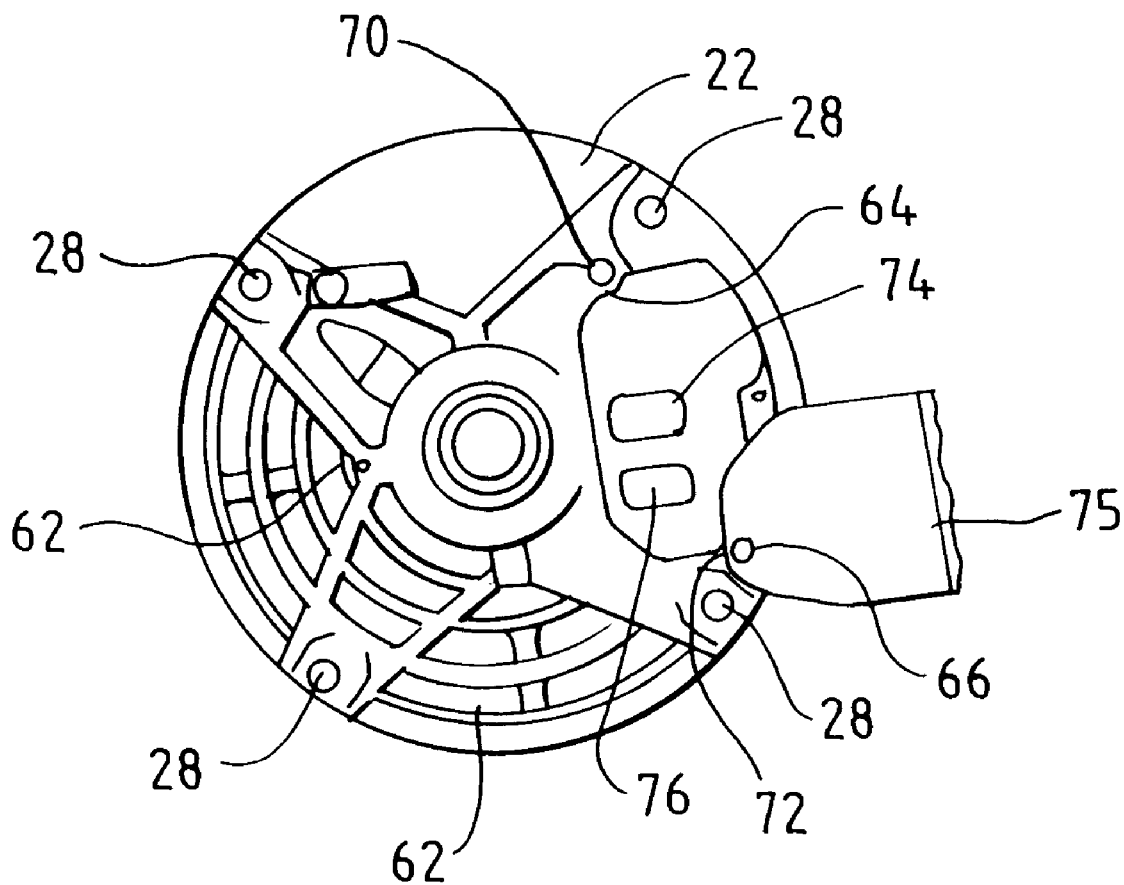
FIGS. 3A and 3B are end views of the motor shown in FIG. 1 which illustrate a voltage selection feature as well as terminal connectors that allow the motor to be connected to an external power source.
Figure 3B:
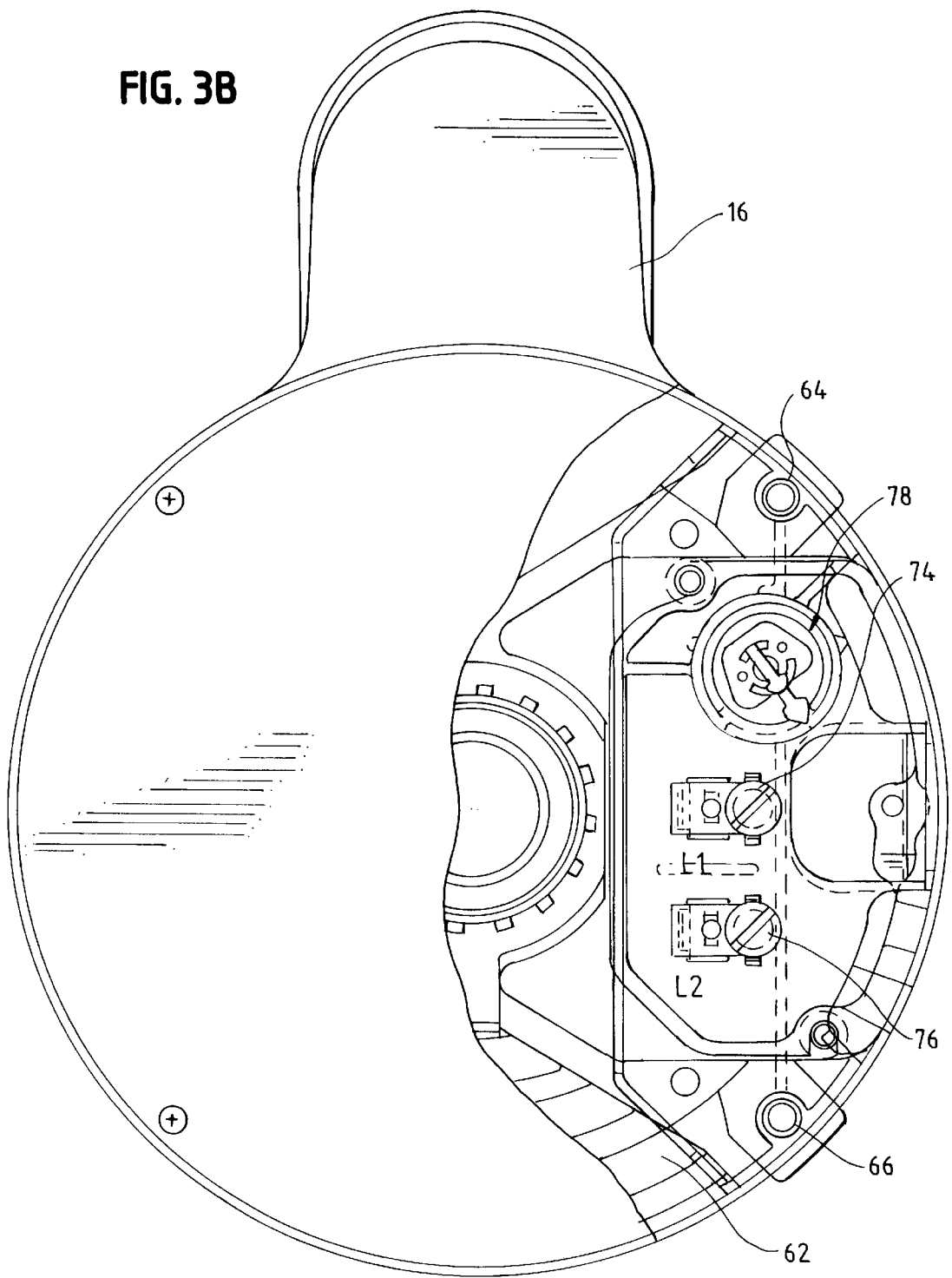

Reffering to FIGS. 3A and 3B, motor frame 26 includes two mounting bosses (not shown) which receive hollow, cylindrical mounting members 64 and 66 of terminal board 68 and are aligned with apertures 70 and 72 in end shield 22 as generally shown in FIGS. 3A and 3B. A cover plate 74 may be attached to the end shield 22 by, for example, securing a number of screws (not shown) to the mounting bosses via apertures 70 and 72. Thus, the terminal board 68 is sandwiched between the end shield 22 and the mounting bosses of the motor frame 26. Preferably, the end shield 22 comprises a metallic material such as, for example, cast aluminum and the terminal board 68 comprises, for example, molded plastic.

Electric motor 10 may be connected to a line voltage supplied by an external power source (not shown) via terminals 74 and 76. A voltage selection switch 78 is mounted on terminal board 68 and is moveable between a first position corresponding to a high voltage setting of, for example, 230 volts and a second position corresponding to a low voltage setting of, for example, 115 volts as discussed in greater detail hereafter. Alternatively, switch 78 may be mounted directly in end shield 22 in an aperture formed therein.

Referring to FIGS. 4A–4C, switch 78 comprises a moveable portion 80 and a fixed portion 82. Moveable portion 80 includes a thin handle 84, a base member 86, and an indicator 88. The base member 86 of switch 78 includes two U-shaped conductors each of which has two downwardly extending terminals. The terminals 90 and 92 of conductor 94 are shown in FIG. 4B whereas the terminals 96 and 98 of conductor 100 are shown in FIGS. 5A and 5B. Terminals 90/92 and 96/98 may be selectively engaged with the terminal nodes 100–106 and open node 108 by moving the handle portion between the first position shown in FIG. 4A and the second position shown in FIG. 4C via the open position shown in FIG. 4B. This allows a user to control the voltage setting of the electric motor 10 between high and low settings as discussed with reference to FIGS. 5A and 5B. Note that the moveable portion 80 may be completely separated from the fixed portion 82 and that the fixed portion 82 may be integrally formed as a portion of the terminal board 68.

Referring to FIGS. 5A and 5B, when the electric motor 10 is to be used at a low voltage setting, a low voltage of 115 volts is connected to line nodes 110 and 112 via terminals 74 and 76 (FIG. 3B) from an external source (not shown) and the moveable portion 80 of switch 78 is disposed in the position shown in FIG. 4C. In this case, the terminals 90 and 92 of U-shaped conductor 94 connect nodes 100 and 102 whereas the terminals 96 and 98 of U-shaped conductor 100 connect nodes 104 and 106. The aforementioned connection arrangement connects the main winding 56 in parallel with the windings 52 and 54 which is desirable due to the relatively high current flow associated with the low voltage setting of the electric motor 10. A thermal protector 114 is included for thermal protection purposes as readily apparent to one of ordinary skill in the relevant art.

When the electric motor is to be used at a high voltage setting, a high voltage on the order of 230 volts is connected to line nodes 108 and 110 via terminals 74 and 76 from an external source (not shown) and the moveable portion of switch 78 is disposed in the position shown in FIG. 4A In this case, the terminals 90 and 92 of U-shaped conductor 94 connect terminal node 100 with open node 108 and the terminals 96 and 98 of U-shaped conductor 100 connect terminal node 102 with terminal node 106. This connection arrangement connects the main winding 56 in series with the windings 52 and 54 which is desirable due to the relatively low current flow associated with the high voltage setting of the electric motor 10.

While the invention has been illustrated and described in detail in the drawings and foregoing description, the same is considered as illustrative and not restrictive in character, it being understood that all changes and modifications that come within the spirit of the invention are desired to be protected.

What is claimed is:

1. An electric motor, comprising:

a frame;

first and second end shields disposed adjacent opposing ends of said frame to define a motor compartment;

a stator winding which is disposed within said motor compartment, includes at least first and second main windings, and is supported at least in part by said frame;

an armature which is mounted for rotation about an axis defined between said first and second end shields such that an air gap is defined between adjacent surfaces of said armature and said stator winding;

a switch which is mounted on said first end shield, has a stationary portion at least partially disposed in said motor compartment, and has a moveable portion disposed outside said motor compartment for engagement in at least first and second positions with respect to said stationary portion so that (1) said first and second main windings are connected in parallel when said moveable portion is disposed in said first position to allow said electric motor to be operated at a low voltage setting and (2) said first and second are connected in series when said movable portion is disposed in said second position to allow said electric motor to be operated at a high voltage setting; and a bearing and shaft assembly for supporting said armature for rotation about said axis, said assembly including a shaft aligned on said axis, a first bearing which coaxially surrounds said shaft and is disposed adjacent said first end shield, and a second bearing which coaxially surrounds said shaft and is disposed adjacent said second end shield, said shaft including a portion which generally outwardly extends from said first bearing outside said motor compartment and is to be connected to a load member, wherein a generally enclosed space is defined between adjacent surfaces of said first bearing, said shaft, and said first end shield, and wherein a sealing material is disposed within said generally enclosed space to reduce the transfer of contaminants from a space outside said motor compartment into said first bearing.

2. The electric motor of claim 1 wherein said sealing material is silicone grease.

3. The electric motor of claim 1 wherein said first end shield includes a molded plastic member secured thereto, the stationary portion of said switch being mounted in said molded plastic member.

4. The electric motor of claim 3 wherein at least part of the stationary portion of said switch is integrally formed as a portion of said molded plastic member.

5. The electric motor of claim 1 wherein said moveable portion is completely separable from said stationary portion.

6. The electric motor of claim 1 further comprising a removable cover which is mounted on said frame to define a second compartment and a capacitor operatively electrically connected to said stator winding, said capacitor being mounted on said housing within said second compartment.

* * * * *